Dec. 25, 1956 F. ABEL ET AL 2,775,087
POWER MOWER WITH CORD SECURING CLIP
Filed Sept. 2, 1953

INVENTORS
FREDERICK ABEL &
BY FRANCIS R. McNEILL

ATTORNEYS

United States Patent Office 2,775,087
Patented Dec. 25, 1956

2,775,087
POWER MOWER WITH CORD SECURING CLIP

Frederick Abel, Dayton, and Francis R. McNeill, New Carlisle, Ohio, assignors to The Huffman Manufacturing Company, Dayton, Ohio, a corporation of Ohio Application September 2, 1953, Serial No. 378,100

1 Claim. (Cl. 56—25.4)

This invention relates to power lawn mowers.

More particularly, the invention relates to power lawn mowers of the type having an electric motor which drives the cutter members and is provided with a length of electric cord for connection to a suitable receptacle to supply operating current for the mower. Unless adequate care is taken in operating such power mowers, accidental fouling of the electric cord with the wheels or even with the cutting members of the mower may occur, and the present invention has as its primary objective the provision of a simple attachment for supporting this cord in such laterally spaced relation with the mower that it is maintained out of the path of the mower for protection against fouling of the cord with the wheels or cutting member.

An attachment for this general purpose is shown in Yeck Patent No. 2,633,688, issued April 7, 1953, to the assignee of the present application, and the present invention has as its major object the provision of an improved and simplified attachment for supporting the electric cord of a power mower which serves both to support the cord out of the path of the mower and also to hold the cord against accidental disconnection from the mower.

It is also an object of the invention to provide a cord supporting attachment for a power mower which includes a clip unit of such construction and arrangement that it will directly receive an intermediate portion of the cord without requiring threading and will positively retain the cord during use while allowing the cord to move with sufficient freedom to prevent possible embrittlement of the wires, and which at the same time is readily releasable.

Additional objects and advantages of the invention will be apparent from the following description, the accompanying drawing and the appended claim.

In the drawing—

Figure 1:
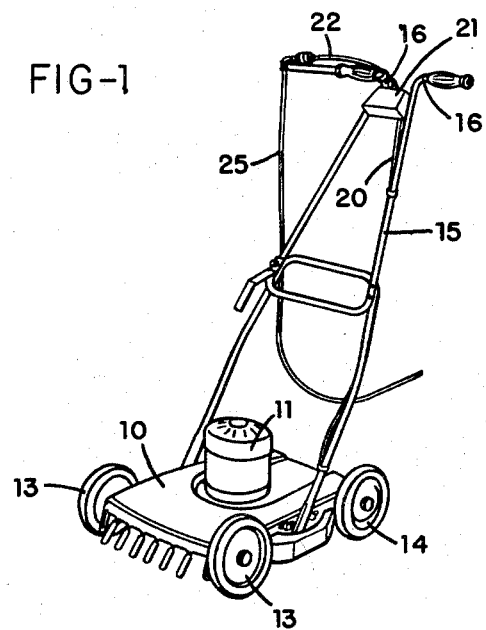
Fig. 1 is a perspective view showing an electric power lawn mower equipped with a cord supporting attachment in accordance with the invention.
Figure 2:
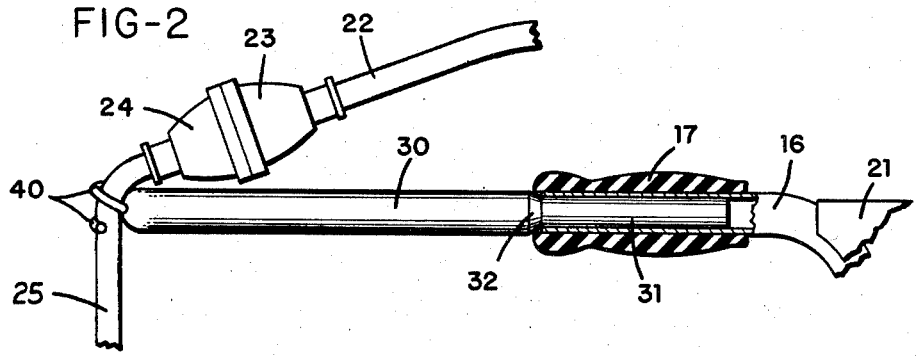
Fig. 2 is an enlarged fragmentary elevational view with parts broken away and shown in section showing the cord supporting attachment mounted in one of the handles of the mower.

Referring to the drawing, which illustrates a preferred embodiment of the invention, the lawn mower includes a main body casing 10 on which is mounted an electric motor 11 having its axis arranged vertically to support a cutting member which is largely concealed by the casing 10 and rotates in a horizontal plane to cut the grass. The casing 10 is supported by a pair of front wheels 13 and a pair of rear wheels 14, and a handle 15 is mounted on the casing for guiding the mower. At its upper end, the handle 15 is provided with a pair of tubular handle portions 16 which extend in opposite directions and are shown as provided with hand grips 17 of rubber or the like. An electric cord 20 extends upwardly from the motor 11 to a switch mounted between the handle portions 16 in a cover 21, and a further cord 22 extends from the switch and is shown as provided with a plug 23 for attachment to a complementary receptacle 24 on the end of an extension cord 25 adapted to be connected with a suitable receptacle in a nearby house, garage or the like which supplies the operating source of current for motor 11.

In order to support extension cord 25 out of the path of the wheels and cutting member of the mower, an extension member 30 is mounted on the mower handle, and this extension member is shown as a rod having a portion 31 of tapered diameter adapted to be received within the open end of one of the handle portions 16 and to lock within the handle member. A beveled intermediate portion 32 on the rod 30 acts as a stop limiting penetration of the portion 31 into the mower handle in the event that the tapered portion 31 fails to lock within the handle. The extension member or rod 30 is preferably of such length that when mounted in one of the handle portions 16, its outer end will be spaced laterally beyond the vertical plane of the adjacent wheels of the lawn mower to support the depending portion of the cord 25 out of the path of the mower.

The extension rod 30 is provided at its outer end with a clip unit indicated generally at 40 which serves as a releasable retainer for the extension cord 25. This clip unit 40 includes a pair of partial ring members 41 and 42 having one end of each thereof welded or otherwise secured to the end of the rod 30 and at opposite sides of the rod. As shown, the ring members 41 and 42 are inclined in opposite directions generally in the form of a V in such manner that an intermediate portion of the cord 25 may be inserted therebetween. Also, the ring members 41 and 42 are of such angular extent that after the cord has been inserted therebetween, it can be turned through approximately 90° in such manner about the axis of the rod that it will enter into and snap within both of the ring members.

Figure 3:
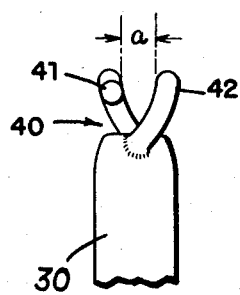
Fig. 3 is a fragmentary view on a larger scale showing the outer end of the attachment and the cord retaining clip unit thereon.
Figure 4:
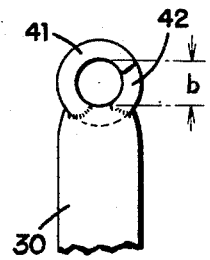
Fig. 4 is a view looking from left to right in Fig. 3.
Figure 5:
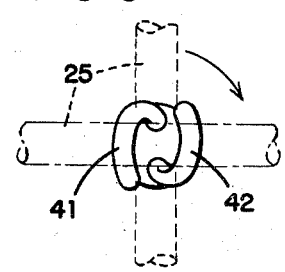
Fig. 5 is a detail end view showing the mode of operation on the clip unit of the cord attachment.

Optimum results are obtained if these ring members 41 and 42 are proportioned with particular relation to a preferred size of extension cord 25, the recommended cord for this purpose being 16-gauge rubber covered cord. As shown in Fig. 3, the ring members 41 and 42 have a maximum relative spacing designated as $a$, and this dimension should be such that the cord 25 can be wedged therebetween, satisfactory results having been obtained with this dimension 0.080 inch less than the outer diameter of the cord. Also, the inner diameter $b$ and angular extent of each of the ring members are such that the cord will be free to slide within the ring members without tending to slip out through the open parts thereof, satisfactory results from this standpoint having been obtained with the inner diameter 0.375 and with each ring member forming with the end of the rod 30 such fraction of a complete circle as to leave a gap substantially equal to the spacing $a$ between the two ring members.

With the clip unit 40 constructed as described and shown and with the connection between the two cords located between the rod 30 and the switch on the handle 15 as shown, the cord 25 is free to slide within the clip unit 40, but the receptacle 24 stops against the clip and prevents disconnection between the extension cord receptacle and the plug on cord 22 in case obstacles are encountered by the extension cord which would tend to sever the connection, thus making it unnecessary to knot or otherwise secure the two cords together except by means of their complementary plug and receptacle. At the same time, the grip on the cord 25 is not so tight as to create possible danger of embrittlement of the conductors within the cord, there being considerable flexibility for movement of the cord as may be required to prevent this result during use.

While the form of the device herein described constitutes a preferred embodiment of the invention, it is to be understood that the invention is not limited to this precise form of device, and that changes may be made therein without departing from the scope of the invention which is defined in the appended claim.

What is claimed is:

For use with a power lawn mower including a main frame provided with wheels and a guiding handle and supporting an electric motor which drives the cutting means of said mower and is provided with a resiliently surfaced electric cord, a supporting member for said electric cord comprising a rod having means at one end thereof for attachment to said handle, clip means on the other end of said rod including a pair of partial ring members mounted in axially aligned relation and extending in opposite directions to define a combined opening of substantially cylindrical shape for receiving said cord therethrough, said ring members each having one end thereof secured to the end of said rod on substantially opposite sides of said rod, each said ring member being of such circumferential extent that the free end thereof is spaced from said rod by a distance slightly less than the diameter of said cord to provide for laterally wedged entry of said cord therein, each said ring member being of an inner diameter sufficiently greater than the diameter of said cord for sliding movement of said cord therethrough following said wedged entry therein, and said ring members being inclined away from each other in an angular relation providing a spacing between the outermost portions thereof which is slightly less than the diameter of said cord to provide for correspondingly wedged insertion of an intermediate section of said cord therebetween followed by said wedged entry within said rings upon substantially 90° of relative rotation of said cord section and said rod about the axis of said rod.

References Cited in the file of this patent
UNITED STATES PATENTS

| | | |
|---|---|---|
| 2,468,160 | Benson | Apr. 26, 1949 |
| 2,633,688 | Yeck et al. | Apr. 7, 1953 |